United States Patent [19]

Dahm

[11] Patent Number: 5,563,391
[45] Date of Patent: Oct. 8, 1996

[54] ORBITAL HEAD LASER WELDER

[76] Inventor: Jonathan S. Dahm, 2525 Arapahoe Rd. #128, Boulder, Colo. 80302

[21] Appl. No.: 298,194

[22] Filed: Aug. 31, 1994

Related U.S. Application Data

[63] Continuation-in-part of Ser. No. 114,450, Aug. 31, 1993, Pat. No. 5,422,456.

[51] Int. Cl.$^6$ .......................... B23K 26/12; B23K 26/00
[52] U.S. Cl. ........................ 219/121.64; 219/121.63; 219/121.86; 228/32
[58] Field of Search .......................... 219/121.12, 121.13, 219/121.63, 121.64, 121.86, 121.85, 74, 121.22; 228/25–29, 32

[56] References Cited

U.S. PATENT DOCUMENTS

| | | |
|---|---|---|
| 3,095,844 | 7/1963 | Thielsch . |
| 3,622,743 | 11/1971 | Muncheryan . |
| 4,080,525 | 3/1978 | Gobetz . |
| 4,162,390 | 7/1979 | Kelly . |
| 4,196,334 | 4/1980 | Thome .................................. 219/61 |
| 4,370,541 | 2/1983 | de Sivry . |
| 4,372,474 | 2/1983 | Taff . |
| 4,414,460 | 11/1983 | Sudo . |
| 4,429,211 | 1/1984 | Carstens . |
| 4,527,042 | 7/1985 | Shinohara . |
| 4,533,814 | 8/1985 | Ward . |
| 4,564,736 | 1/1986 | Jones . |
| 4,577,087 | 3/1986 | Chadwick .................... 219/121.63 |
| 4,578,554 | 3/1986 | Coulter . |
| 4,580,334 | 4/1986 | McCracken . |
| 4,644,129 | 2/1987 | Miller . |
| 4,673,795 | 6/1987 | Ortiz, Jr. . |
| 4,810,848 | 3/1989 | Kaszlauskas . |
| 4,879,450 | 11/1989 | Valentin . |
| 4,906,812 | 3/1990 | Nied . |
| 4,963,714 | 10/1990 | Adamski . |
| 4,983,555 | 1/1991 | Roy et al. . |
| 5,107,090 | 4/1992 | Caillet . |
| 5,117,086 | 5/1992 | Boudot . |
| 5,196,664 | 3/1993 | McGushion . |

FOREIGN PATENT DOCUMENTS 3620585  1/1983  Germany .

OTHER PUBLICATIONS

"Cajon Micro Weld Head", Ca–492, May, 1992, 2 pgs.
"Cajon Welding System", 4 pgs.
"Metal Fume–Free Welding Technology", Yasumitsu Mizuguchi, J. Electrochem., Soc. vol. 140, No. 6, Jun. 1993, 2 pgs.
"Cajon Weld Fittings", Mar., 1992, 4 pgs.
"BN" Series Bellows Sealed Valves, May 1991, 4 pgs.
AMI–Arc Machines, Inc., Model 9CT Cassette–Type Weld Heads, 9–500 WH–Apr. 1990/E, 4 pgs.
"The Technology of Chromium Oxide Passivation on Stainless Steel Surface" Tadahiro Ohmi et al., J. Electrochem. Soc. vol. 140, No. 6, Jun. 1993, 3 pgs.

*Primary Examiner*—Mark H. Paschall
*Attorney, Agent, or Firm*—St. Onge Steward Johnston & Reens

[57] ABSTRACT

A laser welder is provided comprising a housing, an optical fiber, a wheel mounted within the housing and including a slot for receiving an article to be welded, the optical fiber mounted to and wound upon the wheel as the wheel is rotated to bring the fiber around the article, a sleeve for sealing to the article to establish a chamber surrounding the weld zone, the sleeve having a curved window for transmitting the laser light from the fiber to the weld zone, and a clip for removeably mounting the sleeve within the housing coaxial with the wheel. In another aspect, the invention provides the sealing sleeve for use in laser welding. The sleeve preferably includes a ring deformable with heat to clamp the sleeve to the article and center the article along an axis of the sleeve. In a further aspect, the invention relates to a method of welding articles.

20 Claims, 11 Drawing Sheets

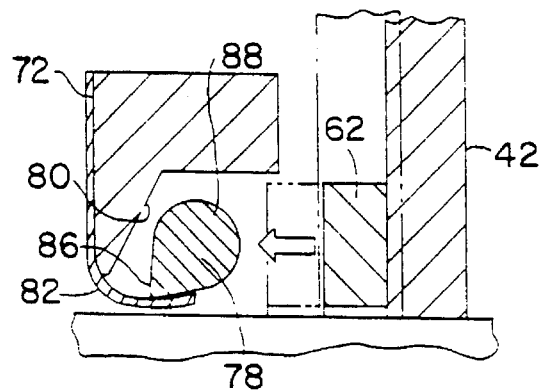
F I G. 6A
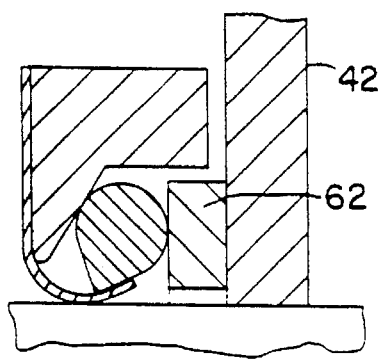
F I G. 6B
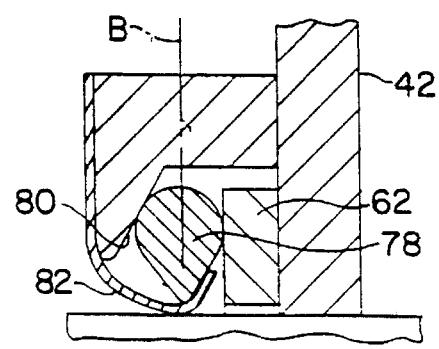
F I G. 6C

ORBITAL HEAD LASER WELDER

This application is a continuation in part of U.S. application Ser. No. 114,450, filed Aug. 31, 1993 now U.S. Pat. No. 5,422,456.

FIELD OF THE INVENTION

The invention relates to a laser welder and, more particularly, to a laser welder and a sealing sleeve and method for providing exceptionally clean welds in tight spaces for applications such as semiconductor process gas systems.

BACKGROUND OF THE INVENTION

As semiconductor devices have become more highly integrated, the wafer feature dimensions and depth profile have been reduced to below the subhalf micron level. To achieve high device reliability and low defect rates, it is essential to maintain an ultraclean environment on the wafer. This requirement has placed a demand for higher gas system performance which in return demands cleaner welding technology. The process gas systems typically include an intricate array of tightly packed gas lines and valves which must be welded together. Very often, gas system welding is done in a clean room or like environment to reduce the incidence of particulate contaminants and an inert gas jet is used to reduce oxidation of molten stainless steel in the weld pool. The quantity of molten metal at the weld spot, and the environment at the weld zone created by the welder and the welding method itself are generally the greatest sources of gas panel weld contamination.

Automatic orbital head arc welding systems are known and used to weld stainless steel gas panels. The systems disclosed in U.S. Pat. Nos. 4,370,541 5,196,664 5,107,090 4,810,848 and 4,372,474 include a variety of features and weld head constructions. Arc welding systems generally produce high levels of heat which cause excessive melting and vaporization. Molten metal may trap particulates or oxidize and increase the incidence of contamination. Similarly, vaporization of corrosion resistant metal in the alloy being welded may lead to increased corrosion at the weld and possible contamination.

The '664 patent discloses a hinged clamp having an inert gas discharge to produce an increased purity weld by providing the gas in a stream which does not pass over particle-generating components such as gears. Though this may reduce the incidence of particles blown directly onto the weld, it does not eliminate generation of particles in the weld environment. Further, the gas jet may reduce, but does not eliminate oxidation of molten metal in the weld pool, does not limit vaporization of corrosion resistant alloys, and may even spatter the molten metal, if the pressure of the jet is raised in an attempt to improve weld purity, creating particulate contaminants.

The '541 patent discloses an envelope 7 which surrounds the weld zone and includes electron gun 13 within an enclosure 6 which is evacuated to limit weld pool oxidation. The welding element must be within the vacuum chamber so it can arc to the tube and affect the weld. As a consequence, the chamber must be large enough to include the entire weld head. This arrangement, therefore, can not readily be used for applications such as gas panels in which welds must be made in areas which often do not provide sufficient space to establish a surrounding vacuum chamber, and inherently limits weld purity since the weld zone includes moving parts which may generate particulate contaminants.

Laser welding is also well known in the prior art. U.S. Pat. Nos. 4,879,450 4,141,460 4,162,390 and German Patent Application No. 3620585 A1 disclose a variety of laser welding techniques for manufacturing a number of different products. The German application relates to laser welding a cold solder joint. The '042 patent relates to laser sealing vacuum insulated bottles. The '450 patent relates to welding pressure transducers, watch crystals or other parts wherein one part is permeable to a laser beam. The '460 patent relates to sealing light bulbs by melting an aperture blockade member. The '390 patent relates to using a gas stream and exhaust port for simultaneously cooling the light transmitter, deflecting ionized particles, and removing weld debris. None of the techniques appear to be directed to welding tubes in abutment in tight spaces, or to include a pressurized chamber for the purpose of obtaining high purity welds in tight spaces.

U.S. Pat. Nos. 4,080,525 4,429,211 and 4,533,814 disclose laser pipe welding apparatuses which include reflectors for aligning and focusing the beam. In the '814 device, the reflector is moved around the pipe by hinged arms. U.S. Pat. Nos. 4,578,554 4,564,736 4,673,795 4,963,714 and 4,906,812 disclose fiber optic laser welding devices having a variety of features. The '812 device mechanically engages and applies pressure to the workpiece. The '736 device is handheld and includes an inert gas jet. None of these devices apparently include a pressurized chamber, or appear particularly adapted to welding in tight spaces or producing clean, repeatable welds.

What is desired, therefore, is a laser welder that provides low heat input, clean welds in tight spaces such as a gas delivery panel.

SUMMARY OF THE INVENTION

Accordingly, it is an object of the invention to provide a laser welder producing high purity welds in tight spaces.

Another object of the invention is to provide a laser welder in which a high pressure inert gas chamber surrounds the weld zone and the laser shines through the chamber to affect the weld.

Yet another object of the invention is to provide a laser welder of the above character including an orbital weld head.

Still another object of the invention is to provide a laser welder of the above character including a fiber optic cable for transmitting the laser.

Yet a further object of the invention is to provide a sealing sleeve of the above character including a window coated with Carbon Nitride to reduce the reactivity of the window and also to reduce adherence of molten weld metal.

Yet a further object is to provide a method of laser welding using a laser welder of the above character.

These and other objects are achieved by provision of a laser welder comprising an optical fiber, a wheel including a slot for receiving an article to be welded, the optical fiber mounted to and wound upon the wheel as the wheel is rotated to bring the fiber around the article, and a sleeve for sealing to the article to establish a chamber surrounding the weld zone, the sleeve having a curved window for transmitting the laser light from the fiber to the weld zone.

The sleeve preferably includes a sealing ring deformable to clamp the sleeve to the article and center the article along an axis of the sleeve. Preferably, a source for introducing pressurized inert gas to the chamber is provided to reduce oxidation and vaporization of the molten metal. A lens mounted on the wheel preferably focuses laser light leaving the fiber to a spot in the weld zone while also spreading the light over a wide area on the window.

The laser is preferably an Nd:YAG laser operating in modulating current continuous wave mode. The laser may have a continuous operating mode to provide a smoother weld. The laser may also include a Q-switch which creates a high energy burst at the end of each period to vaporize energy-absorbing material off of the window.

In another aspect the invention provides a sleeve having a sealing ring for sealing the sleeve to the article being welded. The sealing ring is preferably formed from a polymer with a high coefficient of thermal expansion and is therefor deformable with heat to reduce its inner diameter and seal the sleeve to the article. The sealing sleeve is preferably formed from low OH quartz or other hard, nonreactive transparent material such as clear silicon carbide formed by chemical vapor deposition, although it may be formed of a nontransparent material and include a transparent portion or window. The sleeve preferably includes a coating of Carbon Nitride to prevent outgassing of the sleeve material and adherence of molten weld metal.

In a further aspect, the invention relates to a method of welding articles comprising the steps of placing a sleeve having a transparent region over the article, sealing the sleeve to the article such that the transparent region is adjacent to a weld zone, introducing pressurized inert gas into the sleeve to reduce vaporization, and directing laser light from an optical fiber through the transparent region toward the article.

The invention and its particular features and advantages will become more apparent from the following detailed description considered with reference to the accompanying drawings.

BRIEF DESCRIPTION OF THE DRAWINGS

FIG. 1A is partially exploded and cut away to reveal components of the weld head and fixturing device.

FIGS. 6A–6C are a series of enlarged partial views of the sealing sleeve embodiment of FIG. 2 and the fixturing device of FIG. 1 which illustrate operation of the sealing cam ring of FIG. 3 upon tightening of the fixturing device.

DETAILED DESCRIPTION OF THE INVENTION

Figure 1:
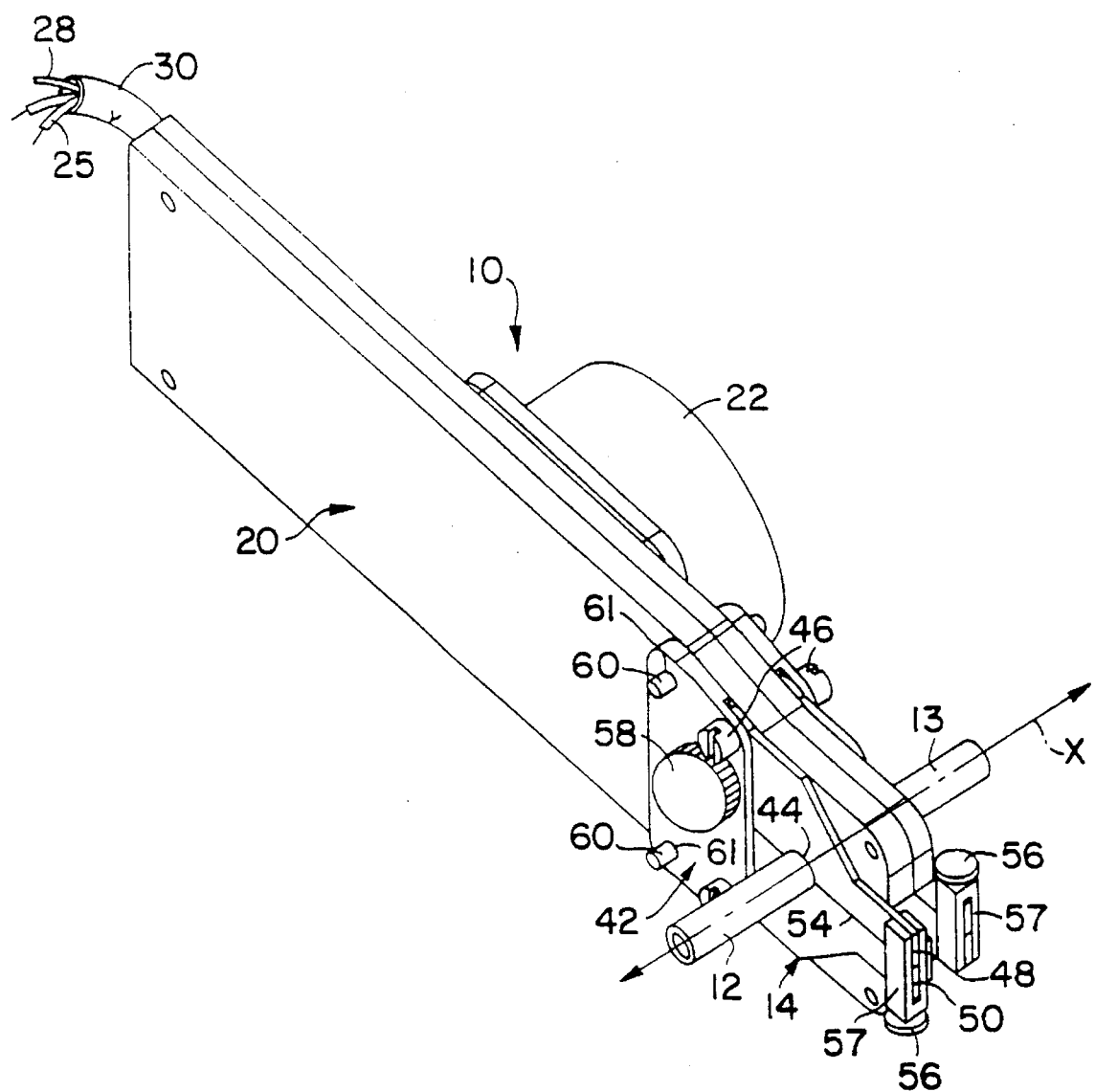
FIGS. 1 and 1A are front isometric views of one embodiment of a laser welder in accordance with the invention.
Figure 1A:
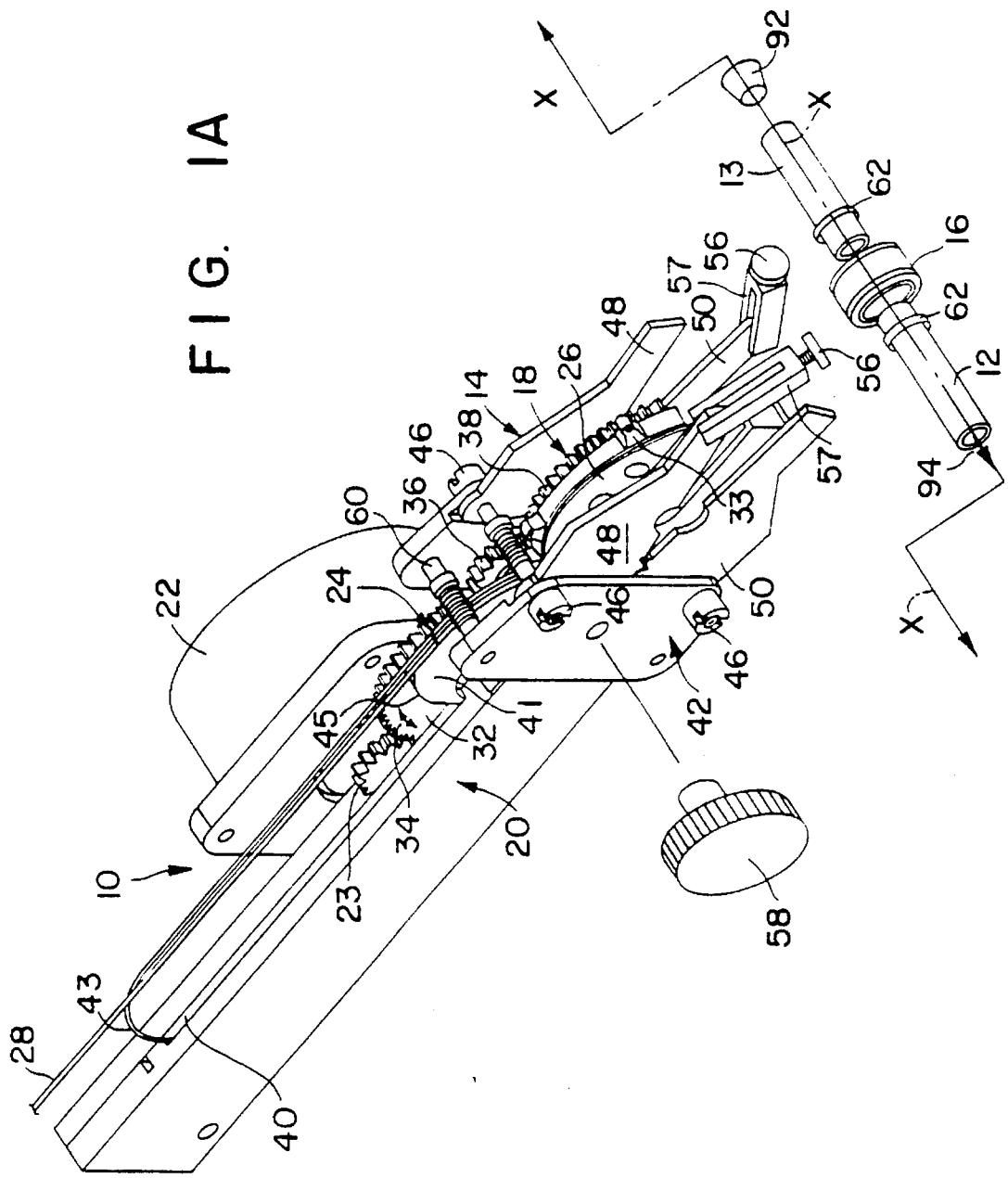
Figure 10:
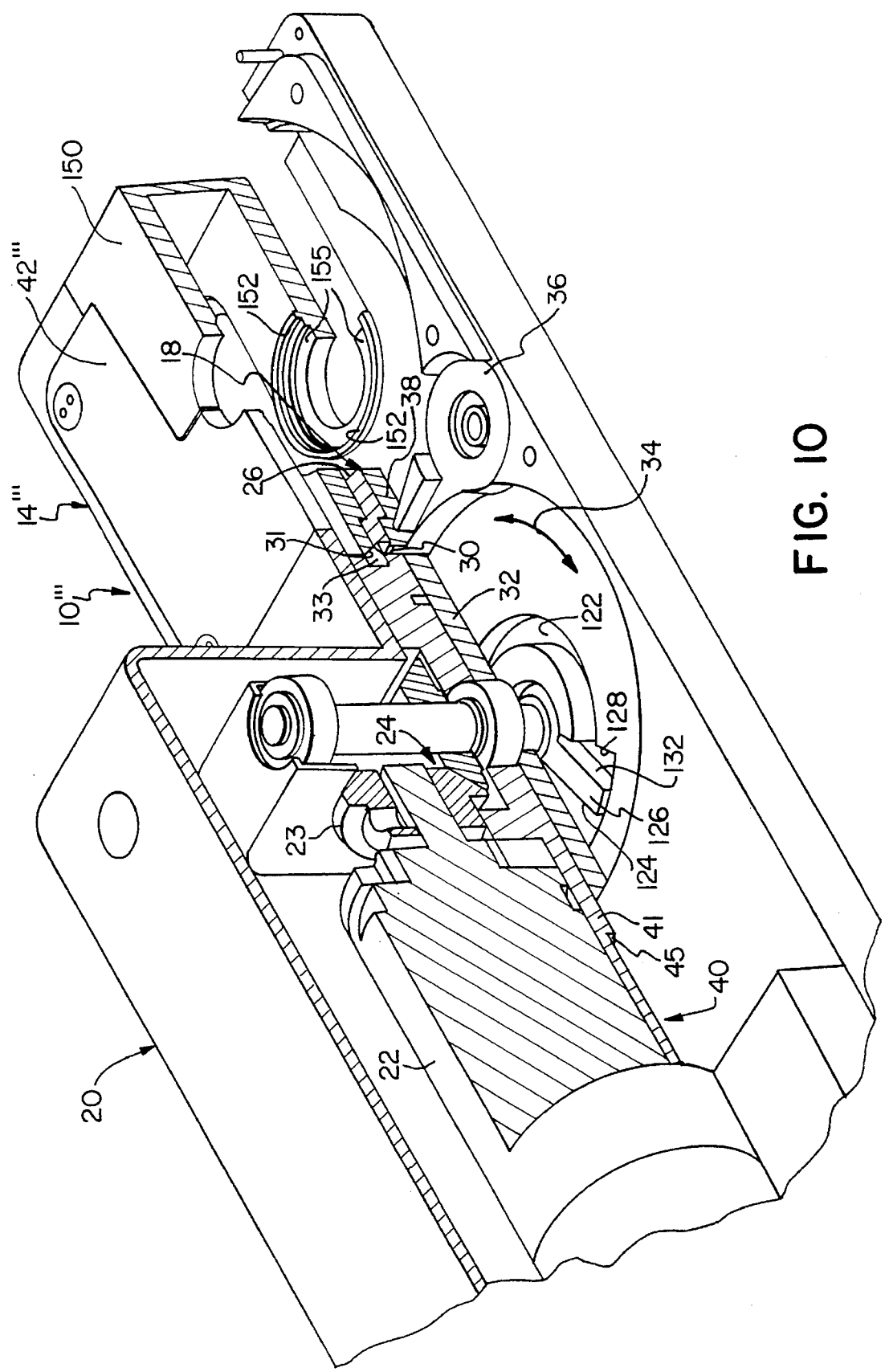
FIG. 10 is a front isometric view of another embodiment of the laser welder in accordance with the invention which is partially cut away to reveal details of the fixture plates and clip.

FIGS. 1, 1A, and 10 are front isometric views of orbital head laser welders 10, 10''' in accordance with several embodiments of the invention. In FIG. 1, welder 10 is shown fully assembled to weld tubes 12, 13 together in abutment. In FIG. 1A, welder 10 is shown in a partially exploded and broken away view illustrating the components and their assembly to weld tubes 12, 13 or other articles. In FIG. 10, welder 10' is shown in a partially broken away view illustrating the components and their assembly with clip 150 to weld tubes 12, 13.

Orbital head laser welder 10 generally comprises a fixture 14 for holding tubes 12, 13, a sleeve 16, 16', 16" for sealing around a weld zone 90 (see FIGS. 1A, 4, 7 and 9) at abutting ends of tubes 12, 13, and a weld head 18 for directing laser light completely around tubes 12, 13 at the weld zone. Orbital head laser welder 10''' generally comprises a fixture 14''' for holding tubes 12, 13, a sleeve 16''' for sealing around weld zone 90 (see FIG. 11) at abutting ends of tubes 12, 13, and a weld head 18 for directing laser light completely around tubes 12, 13 at the weld zone. Laser welding is preferable to TIG welding for clean weld applications because laser welding uses less heat input and thus changes the molecular structure of the stainless steel or other weld material less; creates less vaporization, and thus reduces loss of corrosion resistant alloy metals (e.g., chromium or nickel in stainless steel); and welds with a narrower and smoother bead reducing the incidence of entrapped contaminating particles and reducing the area exposed to corrosion and/or oxidation.

Weld head 18 includes a housing 20 preferably sized to be grasped by a user's hand which encloses gear train 24, and mounting wheel 26. A conduit 30 connected to housing 20 contains an optical fiber 28 and electrical cables 25 for controlling motor 22 mounted in housing 20. Conduit 30 leads to a remote laser light source (not shown) and electronic controller (also not shown). The laser is preferably powered by Thin Metal Film™ batteries which isolate the system from the main line, permit portability of the system, and allow pulse recharging from 110 V outlets. Another way to operate the laser on standard 110 V power is to incorporate large capacitors into the system which provide pulses of sufficiently high energy. It is understood that, if desired, the laser and the controller could be contained within housing 20, however weld head 18 may then not be sufficiently maneuverable to weld tubes or other articles in tight spaces.

The laser is preferably an Nd:YAG, Ho:YAG, or diode laser operating in a modulated current continuous-wave mode for welding. A HeNe or other visible laser may be used to focus and position the beam on the weld spot. It is understood that the laser may also have a continuous-wave mode of operation in order to improve the smoothness of the weld bead or operate at other wavelengths than Nd:YAG, Ho:YAG or various diode wavelengths.

Figure 2:
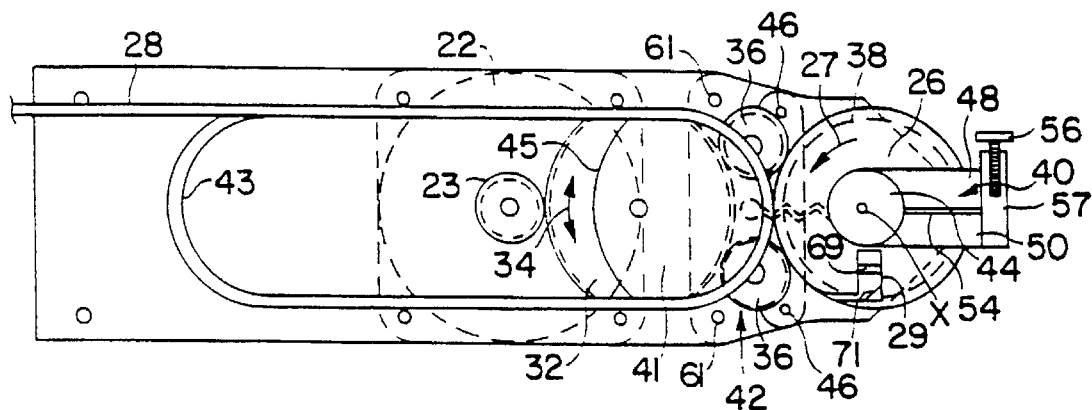
FIG. 2 is a front elevation view of the laser welder of FIG. 1 with the front portion of the housing and fixture removed to illustrate the drive mechanism and optical fiber path.

Referring now to FIGS. 1A, 2, and 10 motor 22 and drive pinion 23 are bidirectionally drivable to rotate pinion 32 of gear train 24 in both clockwise and counter clockwise directions as indicated by arrow 34. By intermediate gears 36, pinion 32 rotates ring gear 38 in the same direction drive pinion 23 is rotated.

Figure 3:
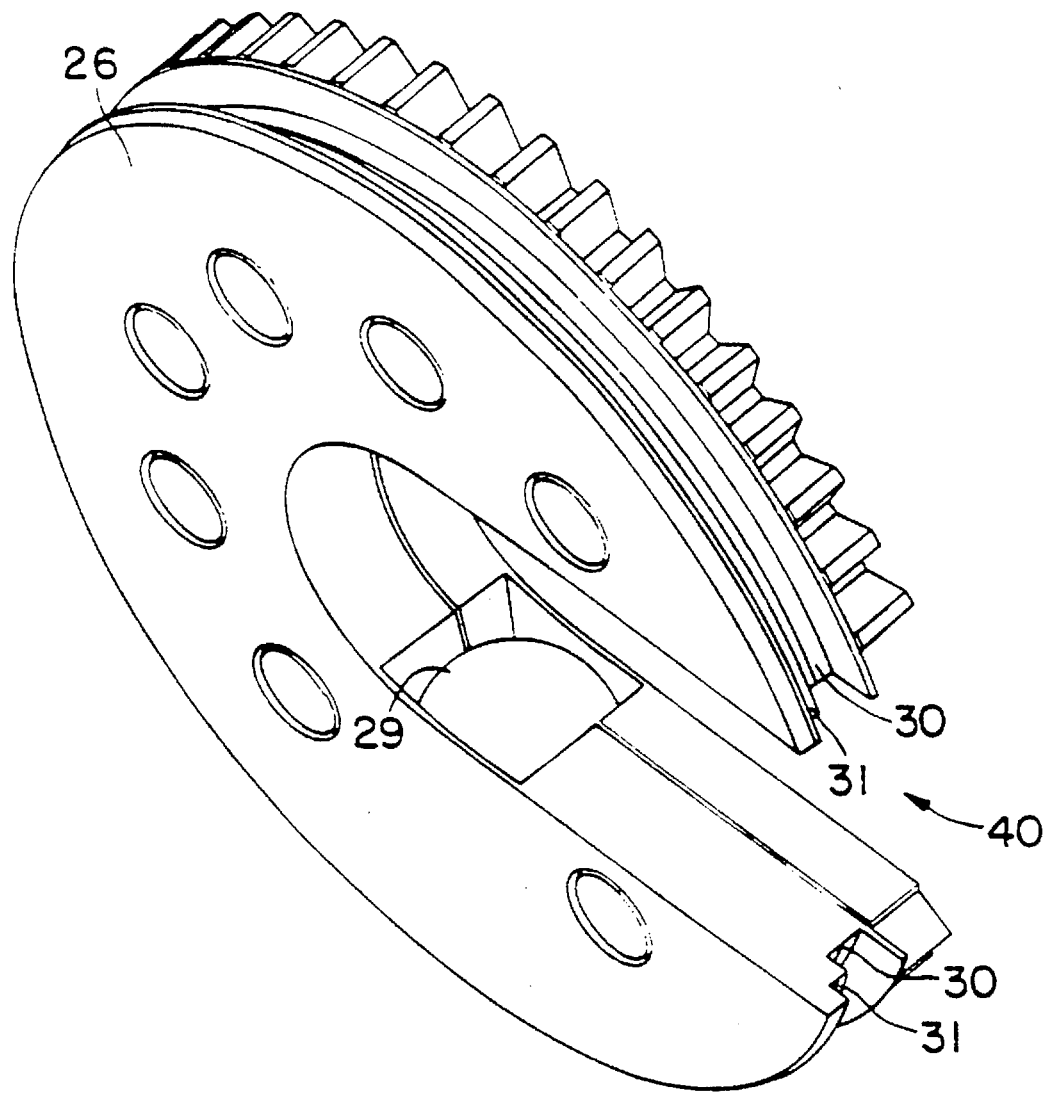
FIG. 3 is an enlarged isometric view of the wheel and ring gear of the laser welder of FIG. 1.

Referring now also to FIG. 3, ring gear 38 is connected to mounting wheel 26 which receives optical fiber 28 connected to lens column 29 so as to direct laser light toward axis X of rotation of ring gear 38. Ring gear 38 and mounting wheel 26 both include a slot or cut out portion 40 for receiving tubes 12, 13 or other articles to be welded along axis X. Drive pinion 23 rotates ring gear 38 and connected mounting wheel 26 in a first direction indicated by arrow 27 (see FIG. 2) to advance optical fiber 28 360° around tubes 12, 13, and then drives ring gear 38 and connected mounting wheel 26 back in the opposite direction to permit welder 10 to be removed from end welded tubes 12, 13. Preferably, motor 22 is relatively high speed, capable of advancing optical fiber 28 through 360° in about 0.5 seconds. This advantageously reduces the total amount of heat input to the tubes, and thus reduces the total amount of molten metal which might oxidize and cause contamination and reduces the volatilization of corrosion resistant alloying elements.

Figure 12A:
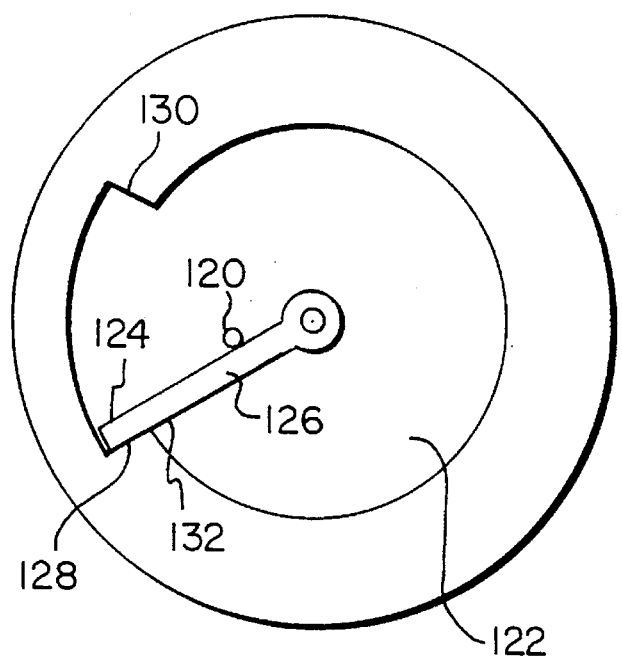
FIGS. 12A–12B are schematic top plan views of a mechanical stop at zero and maximum safe positions to prevent fiber breakage due to weld head overrun.
Figure 12B:
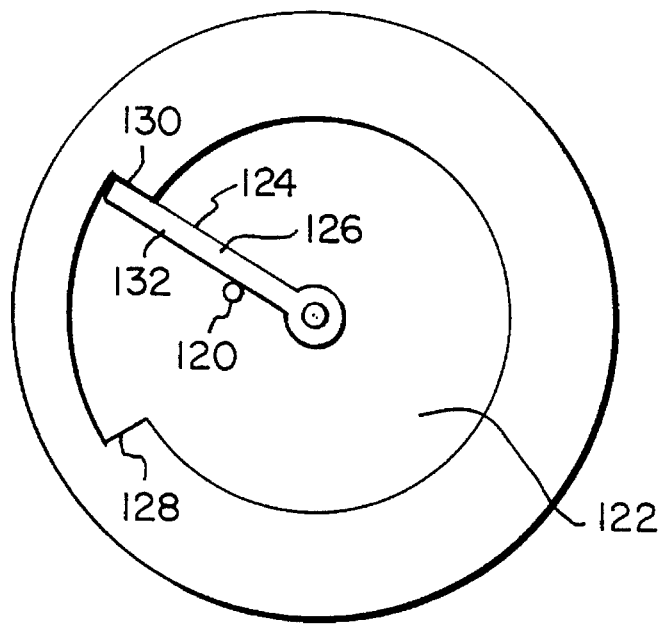

As ring gear 38 is rotated, optical fiber 28 is wound and unwound around mounting wheel 26 which is provided with a groove 30 of a sufficient diameter to prevent rupture, cracking or breakage of the fiber. Slack portions of optical fiber 28 are stored in a take-up box 40 within housing 20 (see FIGS. 1A and 10) which includes minimum radius block 41. Referring briefly to FIGS. 12A and 12B, pinion 32 includes a preventer bar 120 connected thereto and extending therefrom for mechanically limiting the range of rotation of pinion 32 to prevent damage of optical fiber 28. As shown, preventer bar 120 is disposed parallel to the axis of rotation of pinion 32 and extends into a circular groove 122 in housing 20 which is coaxial with pinion 32. In FIG. 12A, bar 120 is in its zero or start position from which lens column 29 is accelerated. The laser is applied to optical fiber 28 only after lens column 29 has reached operating speed. After the laser is applied, motor 22, which is preferably a DC motor advances lens column 29 through about 360° at which point the laser is shut off and ring 38 is reversed to bring preventer 120 back to the zero position against a first surface 124 of movable stop 126. Movable stop 126 is mounted coaxial with pinion 32 and is rotatable through an arc of less than 360° between hard stops 128 at the zero position and 130 at a maximum safe position within groove 122. As preventer 120 approaches 360° of rotation it contacts a second surface 132 of movable stop 126 and rotates the movable stop to bring first surface 124 thereof toward hard stop 130 within groove 122 (see FIG. 12B). The purpose of hard stop 130 is to prevent pinion 32 and thus lens column 29 from rotating past a maximum safe position beyond which optical fiber 28 may be damaged. It is understood, of course, that in normal operation preventer 120 will not stop pinion 32, rather a controller (not shown) for the d.c. motor will stop and reverse the motor when pinion 32 has rotated 360° with the laser on. In reverse, the controller stops the motor on the current rise caused by the preventer 120 rotating movable stop 126 into contact with hard stop 128.

A second groove 31 in mounting wheel 26 receives a ring 33 (see FIGS. 1A, 3 and 10) provided as a part of housing 20 which serves as a bearing for rotation of ring gear 38. Preferably, groove 31 is female, v-shaped (see FIG. 10) instead of female rectangular (see FIG. 3) so that only two bearing surfaces exist instead of three and so that groove 31 may be self centering on ring 33. It is understood that ring 33 is preferably provided with a matching shape (male, v-shape in FIG. 10). Most preferably, the v-shaped bearing surfaces of groove 31 and ring 33 are coated with amorphous diamond-like carbon, or carbon nitride or silicon nitride for friction reduction and wear resistance. Fiber 28 enters housing 20 turns around block 41 providing a safe radius and forms a loop 43 of slack within take-up box 40 and returns to block 41 where it is again introduced to groove 30 and then mounted on wheel 26. When fiber 28 has been fully advanced around tubes 12, 13, loop 43 of fiber 28 advances within take-up box 40 toward edge 45 of minimum radius block 41.

Generally, relatively thin fibers, having a thickness of about 300 µm, are preferred since they typically require a relatively smaller safe-winding diameter. It is understood, however, that due to the power requirements for welding stainless steel and other materials, only certain minimum thicknesses may be used for a given optical fiber composition. Thus, the choice of optical fiber may be limited. 3M's step-index optical fiber having a thickness of 300 µm, and a minimum bend radius of about 12 mm has been found to be effective for stainless steel gas system welding. Further, by introducing laser light to the optical fiber at a slight angle of about 3°–5° to the fiber axis, fibers are generally capable of providing consistent radial intensity so that the melt pool is evenly heated and the peak temperature of the molten metal is reduced. The laser light is preferably focussed into the optical fiber using a spheric or binary optical technology.

Figure 2A:
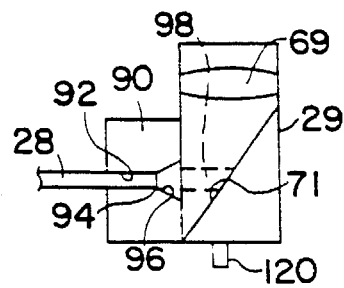
FIG. 2A is an enlarged partial schematic view of the lens column and optical fiber of the laser welder of FIG. 1.

Referring to FIG. 2A, lens column 29 is shown in an enlarged view to illustrate attachment of optical fiber 28. Fiber 28 is surrounded by and terminates within a ceramic collar 90. Collar 90 includes a passage 92 for receiving fiber 28. At termination point 94, passage 92 flares outwardly away from fiber 28 in the direction of lens column 29. Flared surface 96 includes a reflective coating to combine lower intensity light at the fringes to form a beam 98 having a more uniform radial intensity.

Figure 2B:
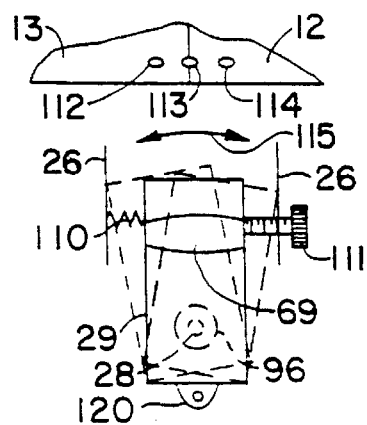
FIG. 2B is an enlarged side view of the lens column of the laser welder of FIG. 1.

Referring to FIG. 2B, lens column 29 is pivotally mounted at 120 to mounting wheel 26 between a spring 110 and an adjustment screw 111 for adjusting the position of a weld spot 112, 113, 114 so that it lies on weld line 91.

In the laser welder embodiment of the FIGS. 1, 1A and 2, fixture 14 comprises a pair of opposing plates 42 including holes 44 for receiving and holding tubes 12, 13 or other articles to be welded. To accommodate tubes having different sizes, one or both of plates 42 may be replaced or collets (not shown) may be fitted in holes 44. Although illustrated as integral in one piece with weld head 10, it is understood that fixture 14 may be provided as a separate component.

Each of fixture plates 42 includes hinges 46 for moving pivoting portions 48, 50 of plates 42 away from axis X to receive tubes 12, 13 in holes 44 thereof. In this regard, the line 54 which separates pivoting portions of 48, 50 plates 42 intersects holes 44. A threaded rod 56 and cooperating latch 57 connect the pivoting portions 48, 50 and clamps holes 44 around tubes 12, 13.

Fixture 14 is connected to, or maybe mounted over, weld head 18 such that holes 44 are centered on axis X. Another threaded rod or the like 58 is provided to move fixture plates 42 toward and away from each other in a direction parallel to axis X. One or more guide shafts 60 on one plate 42 received by holes 61 in the other plate 42 insure that holes 44 of opposing plates are maintained in alignment (see FIG. 1).

As plates 42 move inwardly, they press spacers 62 (see FIG. 1A) into ends of sleeve 16, 16' 16" to seal it to tubes 12, 13. It is understood that spacers 62 may also be provided molded directly on plates 42 in the form of lips or ridges 63 surrounding holes 44 (see FIG. 7).

Figure 4:
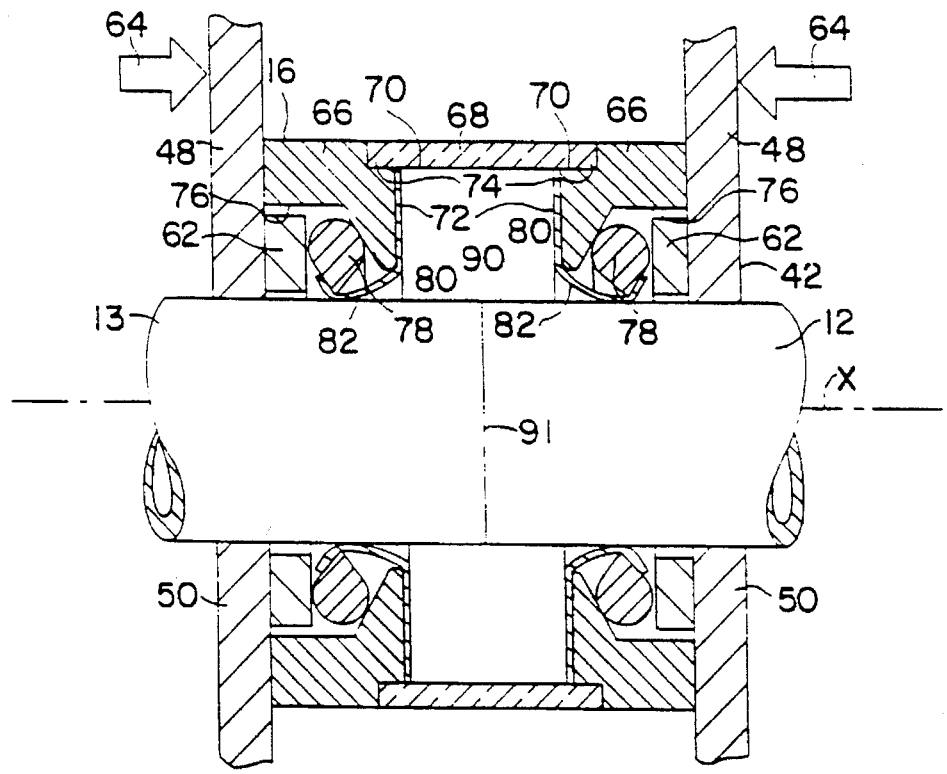
FIG. 4 is an enlarged front cross-sectional view of one embodiment of the sealing sleeve of the laser welder system of FIG. 1.
Figure 5:
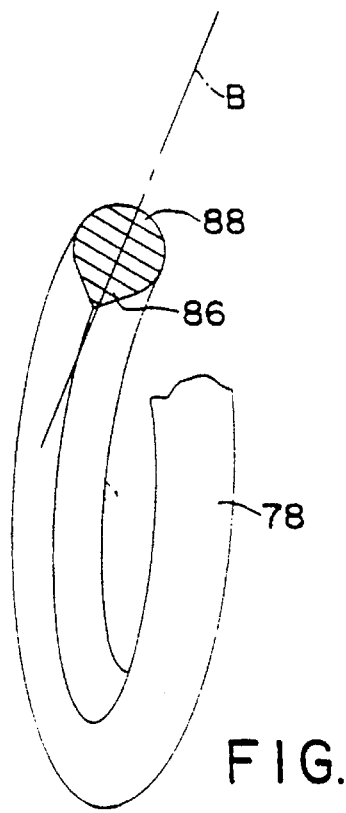
FIG. 5 is a further enlarged view of the sealing cam ring of the sealing sleeve embodiment of FIG. 2.
Figure 7:
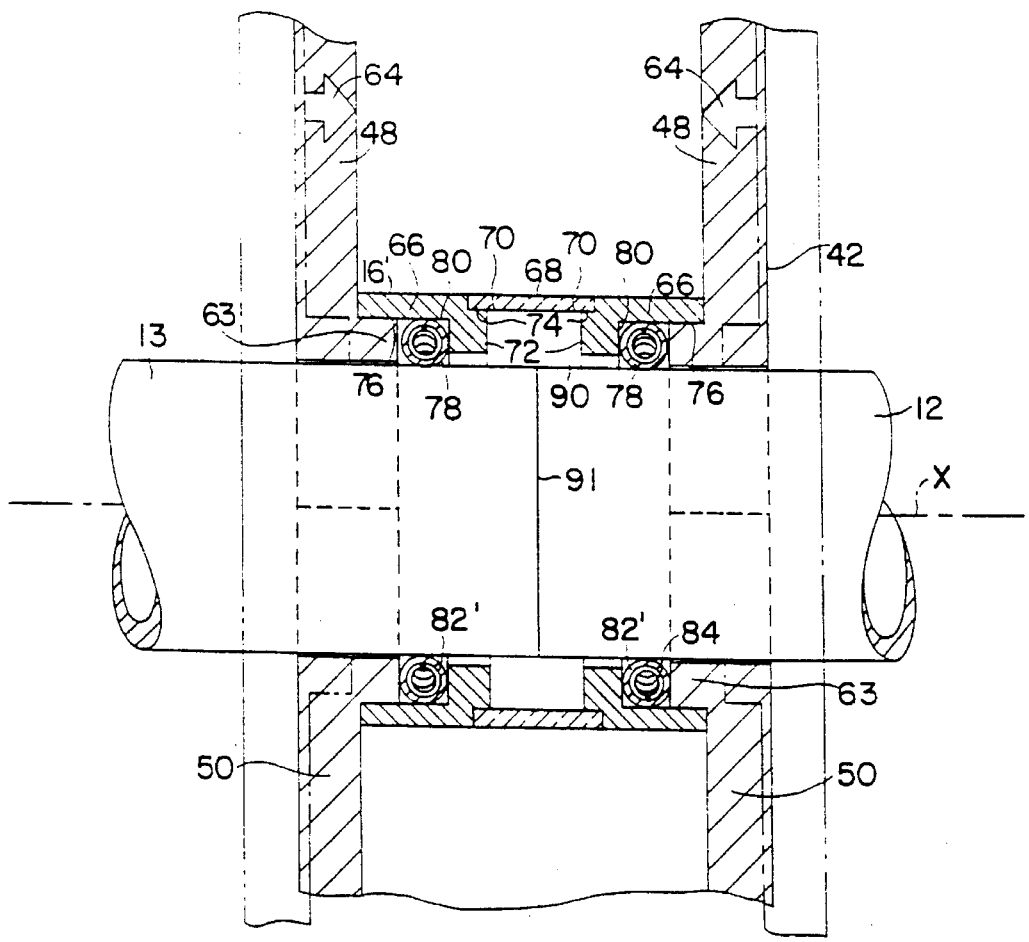
FIG. 7 is an enlarged front cross-sectional view of another embodiment of the sealing sleeve of the laser welder of FIG. 1.
Figure 8:
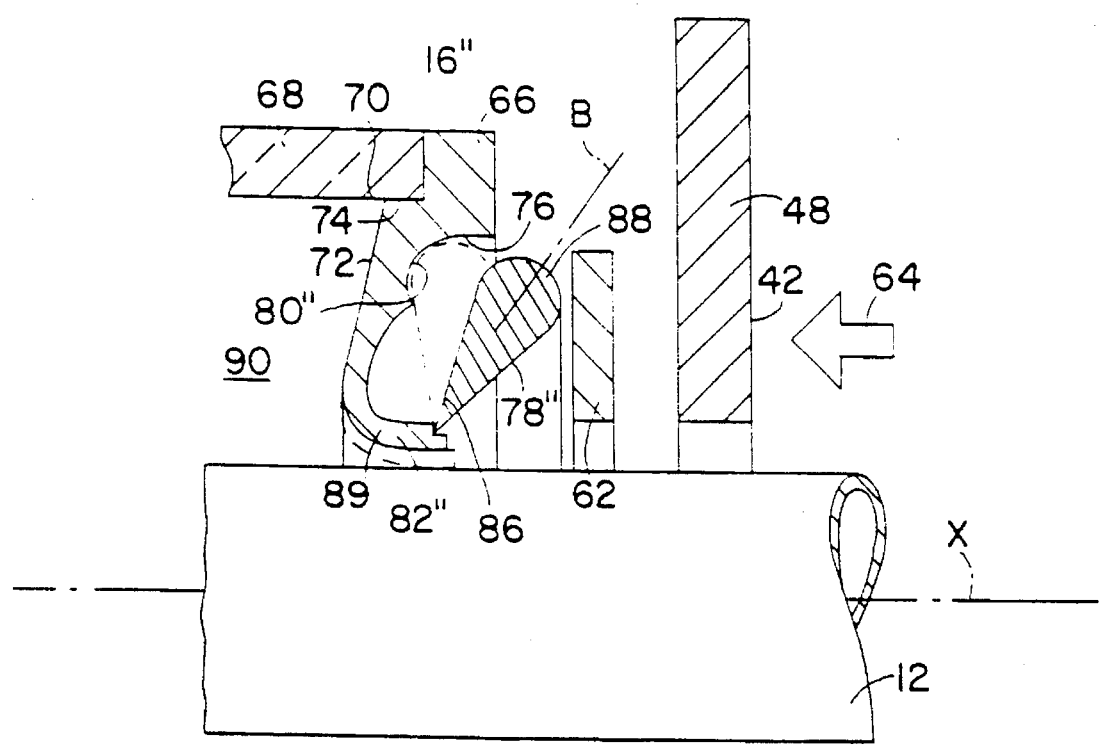
FIG. 8 is an enlarged partial front cross-sectional view of another embodiment of the sealing sleeve of the laser welder of FIG. 1.
Figure 11:
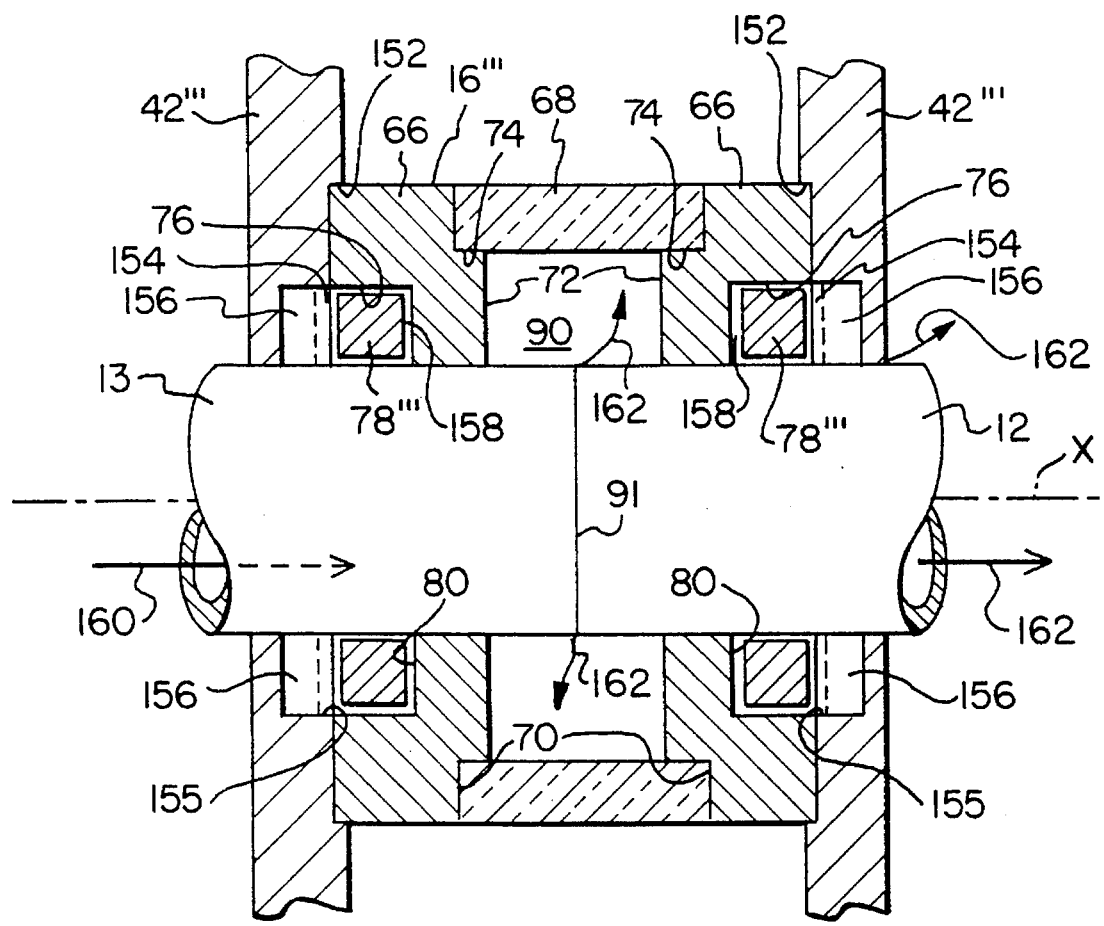
FIG. 11 is an enlarged front cross-sectional views of another embodiment of the sealing sleeve specially for use with the laser welder of FIG. 10.

Referring now to FIGS. 4 and 7, two embodiments 16 and 16' of the sealing sleeve are shown in enlarged, cross-sectional views sealed to tubes 12, 13 after plates 42 have been moved inwardly, as indicated by arrows 64, to clamp on either side of sleeve 16. In FIG. 8, embodiment 16" of the sealing sleeve is shown in an enlarged partial schematic view prior to movement of plates 42 in the direction of arrow 64. In FIG. 11, embodiment 16''' of the sealing sleeve is shown in enlarged partial schematic views. Sleeve 16''' is used with the laser welder 10''' of FIG. 10.

Sleeve 16''' is the preferred embodiment, however, sleeves 16, 16', 16" and 16''' will initially be jointly discussed since they have many common features. Sleeves 16, 16', 16" and 16''' comprise a pair of inserts 66 and curved windows 68 made from quartz, clear c.v.d. Silicon Carbide, Corning glass, Aluminum Oxy Nitride, or the like, preferably with a low water content to reduce the possibility of oxidizing molten steel with water molecules released from window 68 by laser light shining therethrough. The inside surface of window 68 is coated with silicon nitride, thorium oxide or preferably carbon nitride to reduce reactivity of the window, thermally insulate it, and reduce the adhesion of molten weld metal thereto.

Inserts 66 include grooves 70 in surfaces 72 for sealingly receiving an edge 74 of curved window 68. Window 68 transmits laser light from optical fiber 28 onto tubes 12, 13. A lens 69 focusses the laser light to a desired spot within weld zone 90. Lens column 29 also includes a mirror 71 (also see FIG. 2) for reflecting laser light leaving fiber 28 through 90° toward lens 69. In order to facilitate relatively quick and easy lens changes, for example to focus the beam on different size tubes, lens column 29 is preferably a magnetic tube which may be magnetically attached to collar 90. Preferably, lens 69 which provides maximum power on the weld spot while spreading laser power over a fairly large area on window 68 to reduce the possibility of overheating, and utilizes binary optic technology to provide an even temperature distribution across the weld pool surface. The laser may also be provided with a Q-switch which produces a high energy burst, for example, at the end of each peak of the modulated sinusoidal wave, which effectively vaporizes any material accumulated on window 68 that might absorb laser energy and cause overheating. The Q-switch may be of a crystal acousto-optic type or passive chromium type.

Inserts 66 of sleeves 16, 16', 16''' are formed from a ceramic or plastic composite material, or are formed from the same material as the window 68 therein and are fairly rigid. Inserts 66 of sleeve 16" however are formed from a soft metal such as copper which is deformable to seal with tubes 12, 13. Especially where inserts 66 are formed from plastic, but also with other inserts, surfaces 72 of sleeve 16, 16', 16", 16''' beneath curved windows 68 are coated with a protective layer of a corrosion resistant material, preferably Nickel, to prevent outgassing of inserts 66 at elevated welding temperatures which might, as with moisture in the quartz, lead to contamination of molten metal.

Inserts 66 include a recess 76 for receiving sealing rings 78, 78', 78", 78''' against surfaces 80, 80', 80", 80''' within sleeves 16, 16', 16", 16'''. Rings 78, 78', 78", 78''' deform by reduction of their inner diameters to create a seal between inserts 66 and tubes 12, 13. In this regard, deforming rings 78, 78', 78", 78''' reduce their inner diameters and clamp to and substantially center tubes 12, 13 within sleeves 16, 16', 16", 16''' along axis X, whereby the effect of mismatched tube or other article sizes may be minimized and compensated throughout the entire article circumference.

Surfaces 80, 80', 80", 80''' slope inwardly from recesses 76 toward axis X. In sleeve 16, surfaces 80 of inserts 66 also slope toward curved window 68 and the other insert 66. In sleeve 16", a portion of surfaces 80" of inserts 66 also slope toward window 68 and the other insert 66. In sleeves 16' and 16''' surfaces 80' and 80''' are substantially radial.

In each of sleeves 16, 16', 16" and 16''', a soft metal (e.g., copper) portion 82, 82', 82", 82''' forms the seal between inserts 66 and tubes 12, 13.

Ring 78' of sleeve 16' comprises an o-ring formed by an inner spring 84 and an outer layer of copper foil 82'. In operation, ridges 63 attached to fixture plates 42 press into recesses 76 to deform springs 84 and press foil 82' into sealing contact with tubes 12, 13 and surfaces 80'.

Ring 78 of sleeve 16 is a cam ring, and ring 78" of sleeve 16" is a Bellville washer. In operation, spacers 62 are contacted by fixture plates 42 and press into recesses 76 to deform rings 78, 78" and press copper sealing areas 82, 82" toward and into sealing contact with the articles 12, 13.

Referring to FIGS. 6A–6C, 5 and 8 rings 78, 78" have wedge-shaped cross sections with narrower, tapered ends 86 forming an inner diameter and with wider, rounded ends 88 forming an outer diameter. In operation, as spacers 62 press inwardly, (FIGS. 6A and 8), rounded ends 88 slide on surfaces 80, 80" and rotate deforming rings 78, 78" to reduce an inner diameter of the rings by causing a bisector B of the rings' cross sections (FIGS. 6B and 8) to move or rotate from an initial position substantially parallel to sloping surfaces 80, 80" to a final, sealed position more perpendicular to tubes 12, 13 (FIGS. 6C and 8 in dashed lines) with tapered end 86 sealingly pressing copper region 82, 82" against tubes 12, 13. Although not separately illustrated, it is understood that rings 78" of sleeve 16" operate in a very similar manner to seal soft metal flange 89 of sleeve 16" insert 66 to tubes 12, 13 as indicated by the dashed lines in FIG. 8.

FIG. 10 illustrates another embodiment of a laser welder 10''' in accordance with the invention. Those features of embodiment 10''' which are substantially the same as embodiment 10 are not further discussed. Generally, embodiment 10''' differs in providing a different fixture 14''' for holding tubes 12, 13 and for sealing sleeve 16''' to the tubes by deforming rings 78''' without pressing them with fixture 14'''. Plates 42''' of fixture 14''' use heat instead of pressure to deform rings 78'''. Instead of using numerous moving parts, this preferred embodiment of the laser welder includes plates 42''' mounted in a fixed position and a clip 150 for removably locking sleeve 16''' into position, e.g., with magnets, an interference fit, or the like. Plates 42''' and clip 150 all include matching semicircular grooves 152 for receiving end edges of sleeve 16'''.

Referring now to FIGS. 10 and 11, the plates and clip also include arcuate, semicircular resistance heating elements 154 mounted in grooves 155 concentric with the mounting grooves to heat sealing rings 78''' on ends of sleeves 16'''. The heating elements may be mounted by gluing into the grooves. Preferably, the grooves are coated with a ceramic insulating material to reduce heating of plates 42'''. To insure heating, and thus sealing, 360° around tubes 12, 13, each heating element 154 includes lands 156 at each end for contacting to make electrical connection from plate to clip and clip to plate when the clip is secured to the plates.

Sealing rings 78''' are preferably formed from a polymer having a low melting point, a high thermal expansion coefficient and low compressibility to provide good sealing with relatively low temperature heating. Preferably, the heaters at each end of sleeve 16''' are in separate electrical circuits so that they may be individually sealed. Rings 78''' preferably include a graphite or carbon fiber fill to enhance thermal conductivity and increase bulk modulus for improved sealing and fixturing of tubes 12, 13, and to decrease electrical resistivity to permit electroplating. In this regard, rings are electroplated (or electroformed) with a thin film of copper 158 which is sufficiently stretchable to absorb the sealing deformation of ring 78'''. A flash coating of nickel or stainless steel may be added to the copper for corrosion resistance.

The apparatus of the invention enables very clean welds to be made in tight spaces. Referring again to FIGS. 4, 7, 8 and 11, sleeves 16, 16', 16", 16''' surround a weld zone 90 within which laser light from optical fiber 28 may be focussed to a weld spot and moved along a weld line 91. As illustrated in FIG. 1A, one of tubes 12, 13 is preferably closed or sealed with a plug 92 or gas panel valve and a pump (not shown) is connected to the other tube as indicated by arrow 94 to evacuate the weld zone. As illustrated in FIG. 10, inert gas is blown out of the first of tubes 12, 13 at arrow 160 to which sleeve 16''' is sealed which effectively removes air from and provides a pressurized inert gas at arrows 162 to weld zone 90 when sleeve 16''' is sealed to the second tube. Removal of oxygen and particulates from the weld zone reduces the possibility of oxidation contamination. Sealing off weld zone also prevents particulates from sources, such as the weld head itself, from contaminating the weld pool.

Figure 9:
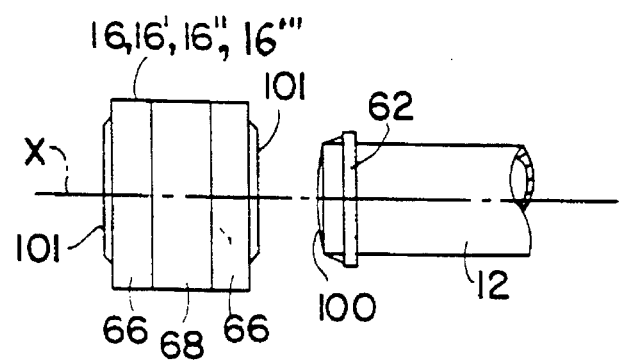
FIG. 9 is an enlarged partial view of the laser welder of FIG. 1 illustrating presealing of sleeves and tubes.

Referring now to FIG. 9, sleeves 16, 16', 16", 16''' are preferably sealed upon manufacture with membranes 101 to prevent contamination prior to use. Similarly, spacers 62 may include membranes 100 so that premounting the spacers also seals the tubes prior to welding.

Even cleaner welds can be produced by introducing pressurized inert gas to weld zone 90. At elevated pressure, the alloying elements in stainless steel (e.g., chromium, nickel and manganese) tend to remain as liquids at weld temperatures and do not vaporize off and possibly form particulate contaminants. Further, the elevated pressure effectively allows faster welds because, without escaping vapor, the weld pool is hotter. Cleaner welds may also be achieved with reductions in weld zone volume, that is, by reducing the sealing sleeve size. A given temperature increase, such as that caused by welding, will provide a greater pressure increase within a smaller chamber. In addition to the advantages flowing from high pressure, a smaller chamber requires a smaller quantity of contaminating vapor to reach equilibrium with the weld pool.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A laser welder for tight spaces, comprising:

a housing;

a rotatable wheel mounted to the housing and including a slot for receiving an article to be welded in position at an axis of rotation of said wheel;

an optical fiber for carrying laser light, said optical fiber mounted to said wheel to direct the laser light toward a weld zone, said optical fiber for winding around said wheel as said wheel is rotated to bring said optical fiber around the article;

a sleeve for sealing to the article to establish a chamber surrounding the weld zone, the sleeve having a curved window for transmitting the laser light from said optical fiber to the weld zone; and a clip for removeably mounting said sleeve within said housing and coaxial with said wheel.

2. The laser welder of claim 1 wherein said sleeve includes a ring deformable to reduce an inner diameter of said ring and clamp the sleeve to the article and center the article along the axis of rotation of said wheel.

3. The laser welder of claim 1 including a lens mounted to said wheel adjacent an end of said optical fiber, said lens for passing the laser light through the curved window over as large an area as possible while focussing the laser light to a spot in the weld zone.

4. The laser welder of claim 1 including means for filling the sealed sleeve chamber with pressurized inert gas.

5. The laser welder of claim 1 including a collar for receiving said optical fiber and converting it to said wheel, said collar having a flared surface for increasing the uniformity of radial intensity in a beam exiting said fiber.

6. The laser welder of claim 1 including a laser for inputting the laser light to said optical fiber at angle of between about 3 and 5° to an axis of said fiber.

7. The laser welder of claim 1 including a laser for outputting the laser light to said optical fiber, the laser having a Q-switch for providing a periodic high energy burst to remove molten metal vapor which may accumulate on the curved window.

8. The laser welder of claim 1 including a laser for outputting the laser light to said optical fiber, the laser having a modulated current continuous operating mode to reduce the total amount of heat input to the article.

9. The laser welder of claim 1 including a removable, replaceable lens for adjusting a position within the weld zone at which the laser light is directed.

10. A method of welding an article comprising the steps of:

placing a sleeve having a sealing ring and a transparent region over the article;

heating the sealing ring to deform it and seal the sleeve to the article such that the transparent region is adjacent a weld zone;

filling the sleeve with pressurized inert gas to reduce vaporization of metals in the alloy being welded;

and directing laser light from an optical fiber through the transparent region toward the article.

11. The welding method of claim 10 wherein the sleeve sealing step comprises clamping the sleeve to the article by deforming a ring within the sleeve to reduce an inner diameter of the ring.

12. The welding method of claim 11 wherein the clamping step comprises sealing the sleeve to one of the tubes and then sealing the sleeve to the other tube but only after the sleeve has been filled with inert gas.

13. The welding method of claim 10 including the step centering the article along a longitudinal axis of the sleeve.

14. The welding method of claim 10 including the step of modulating the laser light between a range of non-zero values.

15. A sealing sleeve for laser welding an article held in position by a fixture plate, comprising an insert, a curved window connected to the insert, and a ring for sealing said insert to the article, said insert having a surface extending toward an axis of the sleeve, said fixture plate for heating said ring to deform it against said surface and to seal the insert to the article.

16. The sealing sleeve of claim 15 wherein said ring deforms such that an inner diameter of said ring is reduced to center the article in said sleeve.

17. The sealing sleeve of claim 15 wherein said sleeve includes a coating on its inside surface, the coating comprising carbon nitride.

18. The sealing sleeve of claim 15 wherein said curved window is low water Quartz.

19. The sealing sleeve of claim 15 wherein said curved window is a silicon carbide.

20. The sealing sleeve of claim 15 including membranes for sealing the sleeve.

* * * * *